(12) United States Patent
Maier

(10) Patent No.: US 6,224,367 B1
(45) Date of Patent: May 1, 2001

(54) MOLD CLOSER FOR THE PRODUCTION OF THERMOPLASTIC ARTICLES

(75) Inventor: Rudolf Maier, Lohmar (DE)

(73) Assignee: Fischer-W. Muller Blasformtechnik GmbH, Troisdorf (DE)

( * ) Notice: Subject to any disclaimer, the term of this patent is extended or adjusted under 35 U.S.C. 154(b) by 0 days.

(21) Appl. No.: 09/239,273

(22) Filed: Jan. 29, 1999

(30) Foreign Application Priority Data

Feb. 3, 1998 (DE) ............................................. 198 04 143

(51) Int. Cl.⁷ ............................. B29C 33/22; B29C 49/56
(52) U.S. Cl. ................................. 425/451.6; 425/451.7; 425/451.9; 425/541
(58) Field of Search ........................ 425/541, 451.6, 425/451.7, 451.9, 532

(56) References Cited

U.S. PATENT DOCUMENTS

| | | | |
|---|---|---|---|
| 3,807,929 | * | 4/1974 | Moore .................................. 425/541 |
| 4,032,277 | * | 6/1977 | Linde et al. ....................... 425/451.7 |
| 4,392,802 | * | 7/1983 | Bortolotti et al. ..................... 425/541 |
| 4,878,828 | * | 11/1989 | Wollschlager et al. ............... 425/541 |

FOREIGN PATENT DOCUMENTS

| | | |
|---|---|---|
| 34 28 823A1 | 2/1986 | (DE) . |
| 37 22 340 | 1/1989 | (DE) . |

* cited by examiner

Primary Examiner—Robert Davis
(74) Attorney, Agent, or Firm—Herbert Dubno

(57) ABSTRACT

A mold closing apparatus in which two linearly-shiftable mutually juxtaposed yokes carry respective halves of a mold for shaping thermoplastic articles. A linear force generator acts directly on each of the yokes in a line and in line with the direction of shifting movement for selectively drawing the yokes together and displacing them apart. The closing forces are applied symmetrically to both yokes.

13 Claims, 5 Drawing Sheets

MOLD CLOSER FOR THE PRODUCTION OF THERMOPLASTIC ARTICLES

FIELD OF THE INVENTION

My present invention relates to a mold closer for an apparatus producing articles from thermoplastic synthetic resins and especially for blow molds capable of producing hollow articles of thermoplastic materials and for use in a blow-molding machine. More particularly, the invention relates to a mold closer of the type in which two mold halves are brought together by linear shifting and especially where the mold closer is capable of synchronously displacing the two mold halves toward and away from one another.

BACKGROUND OF THE INVENTION

A mold closer is described in German patent document DE-A1 37 22 340 for synchronously displacing the two mold halves toward and away from one another for the production of articles from thermoplastic synthetic resins. The apparatus described in this publication has at least one draw rod and a pressure rod, between the ends of which respective yokes are connected, the yokes forming a frame. The draw rod and the pressure rod are mutually parallel and extend in the displacement direction while the yokes extend transversely to this direction and mounting plates are provided to carry the respective mold halves which are displaceable by this mechanism toward and away from each other.

One of the yokes has a cantilever arm which directly engages one of the mold-mounting plates while the other yoke acts upon the second mold-mounting plate through a force-transmitting mechanism. The force-transmitting mechanism is provided on a frame which is suspended from a spatially-fixed housing formed with guide beams separate from the frames and enabling separate movements of the frames. As a consequence the mechanism generating the closing force and the guides for the mold-mounting plates can be decoupled from one another and hence the frame which is affected by the force-transmitting mechanism or carries the latter can be free to deform without affecting the guidance of the mold-mounting plates.

However with this system a precisely synchronous displacement of the mold-mounting plates may not be guaranteed since the mechanism generating the closing force may not act exactly symmetrically on both of the mold-mounting parts.

The synchronous action, moreover, is generated by a hydraulic or pneumatic piston-and-cylinder arrangement which frequently permits a shift in the predetermined calibration position at which mold closing is to occur.

The mold-closing apparatus can, of course, be mounted on a carriage or like transporter which enables the entire mold assembly to shift between, for example, an extrusion station at which a parison can be produced and the blowing station.

As a general matter, moreover, the earlier mold-closing mechanisms, to the extent that they have attempted to ensure synchronous displacement of the mold halves and a precise mold-closing position, have been relatively massive and complex. Moreover, in mold-closing systems of this type it has been difficult to ensure that the mounting plate for a mold half which is relatively distal to the force-generating unit is acted upon symmetrically to the mold-carrying plate which is proximal to that unit. As a result, either deformation of the guiding or guided members could not be entirely avoided or significant structure was required to minimize such deformation.

OBJECTS OF THE INVENTION

It is, therefore, the principal object of the present invention to provide a mold-closing system in which the aforementioned drawbacks are avoided and, more specifically, wherein the mold closing apparatus has a relatively simple construction and can exclude asymmetric closing forces which tend to undesirable deformation.

Another object of this invention is to provide a low-cost mold-closing apparatus which ensures not only synchronous displacement of the two mold-carrying members but also precludes deformation of the guides or guided portions resulting from asymmetrical closing forces.

Still another object of the invention is to provide an improved mold closer, especially for blow molds, whereby the mold closing is carried out with greater precision, uniformity and force symmetry than heretofore.

SUMMARY OF THE INVENTION

These objects are attained in accordance with the invention in a mold-closing system in which each of the two mold halves is mounted on a respective yoke and both of the yokes are directly operated upon by the force-generating unit. More particularly, the mold-closing apparatus can comprise:

two linearly shiftable mutually juxtaposed yokes;

respective halves of a mold for shaping thermoplastic articles each mounted on one of the yokes; and a linear force generator acting directly on each of the yokes in line with a direction of shifting movement thereof for selectively drawing the yokes together and displacing the yokes apart to close and open the mold.

With the system of the invention, there is no lever effect at the side of the system remote from the force-generating unit, i.e. the rear yoke, and no tendency toward deformation of the guide or guided member. The closing force is applied symmetrically to the two yokes directly in the guide plane and the guide ways themselves remain unloaded by the mold-closing force. The symmetrical force transmission to the two yokes simultaneously precludes any meandering of the mold halves from their calibrated positions and the fixed closed position since any closing force deformations act equally upon both yokes and are fully symmetrically in the synchronization of the movements of the two yokes.

Since lever-type force-transmission mechanisms are completely eliminated, the construction of the closing unit is substantially simpler than conventional mold closers of the type described. The entire assembly is significantly lighter since the masses of the tension or draw rods and the pressure rods which hitherto were required to couple the yokes can be eliminated.

Still another advantage of this system is that the reduction in the mass which must be moved, by comparison with earlier mold closers, enables the moving parts to be accelerated and decelerated more uniformly and rapidly, thereby reducing the inertia effect upon the synchronization of the mold closer.

According to a feature of the invention a guide beam is provided which traverses the two yokes and through which a tension or traction rod extends which, at one end bears directly upon the distal yoke while the force-generating units, which engage the other end of the traction rod, is received in a slide which acts directly on the proximal yoke, the traction rod applying its force fully symmetrically to the rear yoke. The forces applied to the two yokes are identical and opposite along the aforementioned beam. When the force-generating unit or actuator is a hydraulic or pneumatic cylinder, the traction rod can form a piston rod of this cylinder.

In that case, the one end of the piston rod is fixed to one of the yokes and the slide bears upon the proximal yoke. The piston rod is concentrically surrounded by the guide beam which is carried by the slide. The cylinder is mounted on the slide.

According to a feature of the invention, the mold halves are carried on upwardly-extending projecting or cantilevered portions of the respective yoke, i.e. on respective upwardly extending yoke arms lying above the guide beam while each yoke is also provided with a downwardly-extending or lower cantilevered yoke arm. Between the downwardly-extending or lower yoke arm, an adjustable stop is provided which fixes the two yoke arms in the closed position of the mold. The stop is preferably provided on a further beam which is formed with a synchronizing rod which can be fixed in one of the lower yoke arms. The free end of the synchronizing rod, i.e. the end which is not fixed in one of the yoke arms, can engage a synchronizing drive, for example, a pinion which can mesh with a rack of the closing slide. The pinion may also mesh with a rack of the further or synchronizing rod.

The stop can be provided with adjustments enabling the setting of the closing position, e.g. via a screw thread connection. The adjustable stop can be used to compensate for thickness tolerances of the mold and ensure the symmetrical closing of the latter. It can also ensure symmetrical force distribution between the two yokes on mold closing.

It has been found to be advantageous, in this connection, to provide the stop with an elastic or spring component which can be, for example, a fluid-pressurizable chamber or compartment (having a pressure accumulator), a spring stack or the like and which can compensate for different thicknesses of the parison or the slug which is introduced into the mold or of the article to be blown therein.

The invention is also applicable to closure force generation via an electric motor. In that case the force-generating unit can be a hollow shaft servodrive electric motor which can be coupled to the traction rod at its proximal end by a ball-screw arrangement. The ball-screw arrangement can be of the type described in U.S. Pat. No. 5,809,838 or as described at pages 2 and 3 of Chapter 26 of Rothbart's *Mechanical Design and Systems Handbook,* McGraw Hill Cook Company, New York, 1965.

The rear end of the traction rod, as in the case of the previously-described embodiment, engages the distal yoke from behind. By contrast with a hydraulic or pneumatic closing-force generator, the electric drive has the advantage that it utilizes a minimum of energy and can be controlled with less expensive control technology while avoiding the additional advantage that maintenance and construction is simplified. For example, oil leakage is not a problem in an electric drive system.

The use of a ball-screw drive arrangement and an elastic element between the traction rod and the distal yoke have been found to both ensure symmetrical force transmission between the two yokes and to improve the synchronous operation. The elastic member can be a prestressed spring, e.g. a stack of Belleville washers or disks, or a hydraulic pressurizable device with a prestressed pressure accumulator or the like. This construction permits the force-generating unit to have a controlled residual stroke. In that case, at the end of the closing action via the ball-screw arrangement and the electric drive, the fully-closed position of the mold may not be reached and the residual displacement or stroke, for example, of about 0.2 mm, may be generated by the resilient means or contributed by the elastic element.

In that case, with the final contribution of the force being generated by the elastic element which can absorb dynamic loading where appropriate, the system can utilize the fact that the ball-screw drive can have a maximum allowable static load which is substantially higher than the dynamic load and can be utilized as the force holding the mold closed during the molding operation.

Because of the "soft" element at the end of the drive train remote from the hollow shaft servodrive with its ball-screw arrangement, the termination of the axial movement does not have to occur simultaneously with the attainment of the closing position and thus the system can be driven relatively rapidly through a coarse closing stroke to approximately the closed position, with the final closing force being then generated at the opposite end of the closing train by hydraulic means, for example.

In still another embodiment of the invention, the near end of the traction rod and the proximal yoke are connected to opposite sides of a toggle arrangement having respective lever arms actuated for a ball-screw drive. One of the toggle levers may thus be connected to the proximal yoke while the other toggle lever is connected to the near end of the traction rod, each of the toggle levers having a common pivot in a nut of the ball-screw drive. An electric motor can actuate the drive, e.g. via rotation of the ball spindle to thereby displace the nut and, in a simple manner, shift the toggle levers from its position of minimum angle between the toggle levers to its position of maximum angle between the toggle levers and thus displacement of the yokes and the mold halves into and out of the closed position of the mold. Between the distal yoke and the rear end of the traction rod, a prestressed spring stack or some other elastic unit is provided as has been described. The spring stack prevents jamming of the toggle lever system. The position of the spring stack relative to the traction rod can be adjustable to compensate for differences in the thicknesses of the blow molds which are used.

According to a feature of the invention, the toggle lever system is arranged in a frame which is displaceable in a guide which, in turn, is mounted on a transport plate of the mold-closing device frame via a further guide. The two frames which are thus movable within one another ensure the counter displacements of the two yokes or mold halves with the linear guides being able to take up the transverse forces which arise from operation of the toggle system. The use of a toggle lever system has the advantage, further, that no special synchronizing arrangement is additionally required.

BRIEF DESCRIPTION OF THE DRAWING

The above and other objects, features, and advantages will become more readily apparent from the following description, reference being made to the accompanying drawing in which.

SPECIFIC DESCRIPTION

Figure 1:
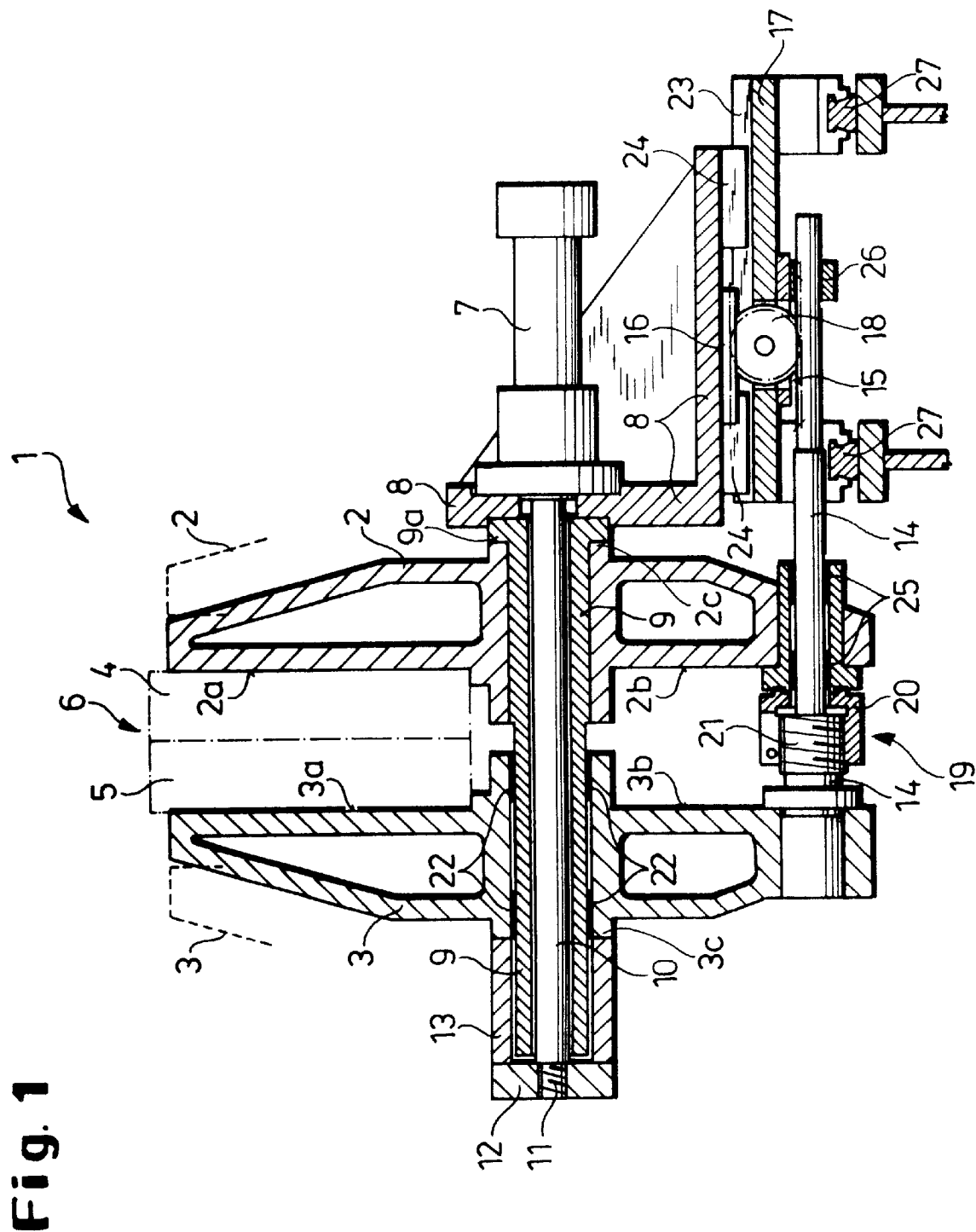
FIG. 1 is a longitudinal section through a mold-closing apparatus taken in the plane of movement of the parts during the closing operation and perpendicular to the planes of the yokes and the plane at which mold closing occurs for a closer in which the closing forces are generated by a hydraulic or pneumatic closing cylinder and is applied directly to two yokes carrying the mold halves.

In FIG. 1, the details of the blow-molding plant with which the mold-closing system is used, have not been seen. It is not possible, for example, to see in this view the extruder and cutter which feeds a parison of suitable length into the mold formed by a pair of mold halves and mounted on the mold closer. Nor is it possible to see the blowing system which inflates or expands the thermoplastic synthetic resin material of the parison to form the blow-molded body. The apparatus of FIG. 1, however, is movable between these two stations as will be described in greater detail hereinafter.

FIG. 1 does show the closing apparatus 1 with its proximal yoke 2 and its distal or rear yoke 3 which, in their open positions, are represented at broken lines in FIG. 1 and in their solid line positions, represent the mold in its closed position. Upwardly extending cantilever mold arms 2a, 3a carry respective mold halves 4, 5 or a two-part mold 6. The closing force generator and actuator for the yokes is formed by a hydraulic closing cylinder 7 which is mounted on a closing slide 8 braced against a flange 9a of a guide beam 9 passing centrally through the yokes 2, 3. The flange 9a bears against a boss 2b of the mold 2c of the mold 2. Similarly, the mold 3 has a boss 3c of the same diameter against which a traction rod or piston rod 10 acts as will be described in greater detail hereinafter.

The guide beam 9 which passes through the yokes 2 and 3 receives the traction rod 10 which may be formed as a piston rod for the cylinder 7 and acts via a closing cover plate 12 connected to the rod end 11 and which bear axially on a chamber-forming sleeve 13 which is of the same diameter as the boss 3c against which it bears. The cover plate 12 may be screwed onto the end 11.

Parallel to the traction or piston rod 10 but between the downwardly-extending cantilever yoke arms 2b and 3b is a synchronizing rod 14 forming a further beam having one end anchored in the lower yoke arm 3b and passing through the lower yoke arm 2b with its free rod end. In the region below the slide 8, to enable simple and rapid replacement where necessary a rack segment 15 is provided on the synchronizing rod 14 and meshes with a pinion 18 which, in turn, meshes with a rack strip 16 on the underside of the slider 8. The pinion 18 is mounted on a carriage 17 which can be shifted with the assembly carriage thereby between the extruder and the blow molder, i.e. transversely to the plane of the paper in FIG. 1. Consequently, movement of the slide to the left effects movement of the rod 14 and the yoke 3 to the right and vice versa.

The force of the closing cylinder 7 is symmetrically applied to the front yoke 2 while the force directly applied by the right 10 and the beam 9 to the rear yoke 3 is exactly symmetrical thereto.

As a result, in the force application there is no lever action or tilting of either of the two yokes and hence no binding so that all of the guides described remain unaffected by the closing force.

The precise closing position can be set by an adjustable stop 19 on the synchronizing rod 14 between the lower yoke arms 2b, 3b of the two yokes 2, 3 and which can be formed as a screw stop. To that end an internally-threaded sleeve 2c may be rotatable on and threadedly engaged with the externally threaded part 21 of the synchronizing rod 14.

Apart from the guide beam 9 with its guiding surfaces 22 for the rear yoke 3, the linear guides include the guide 23 on the transport carriage 17 and engage by guide blocks 24 of the slide 8 and the guide 25 formed in the downwardly-extending cantilever arm 2b and the guide 26 on the underside of the transport carriage 17 for the yoke 2. The transport carriage is displaceable on the rails 27 by an electrical or hydraulic or pneumatic unit (not shown) between the parison extrusion station and the blowing station.

Figure 2:
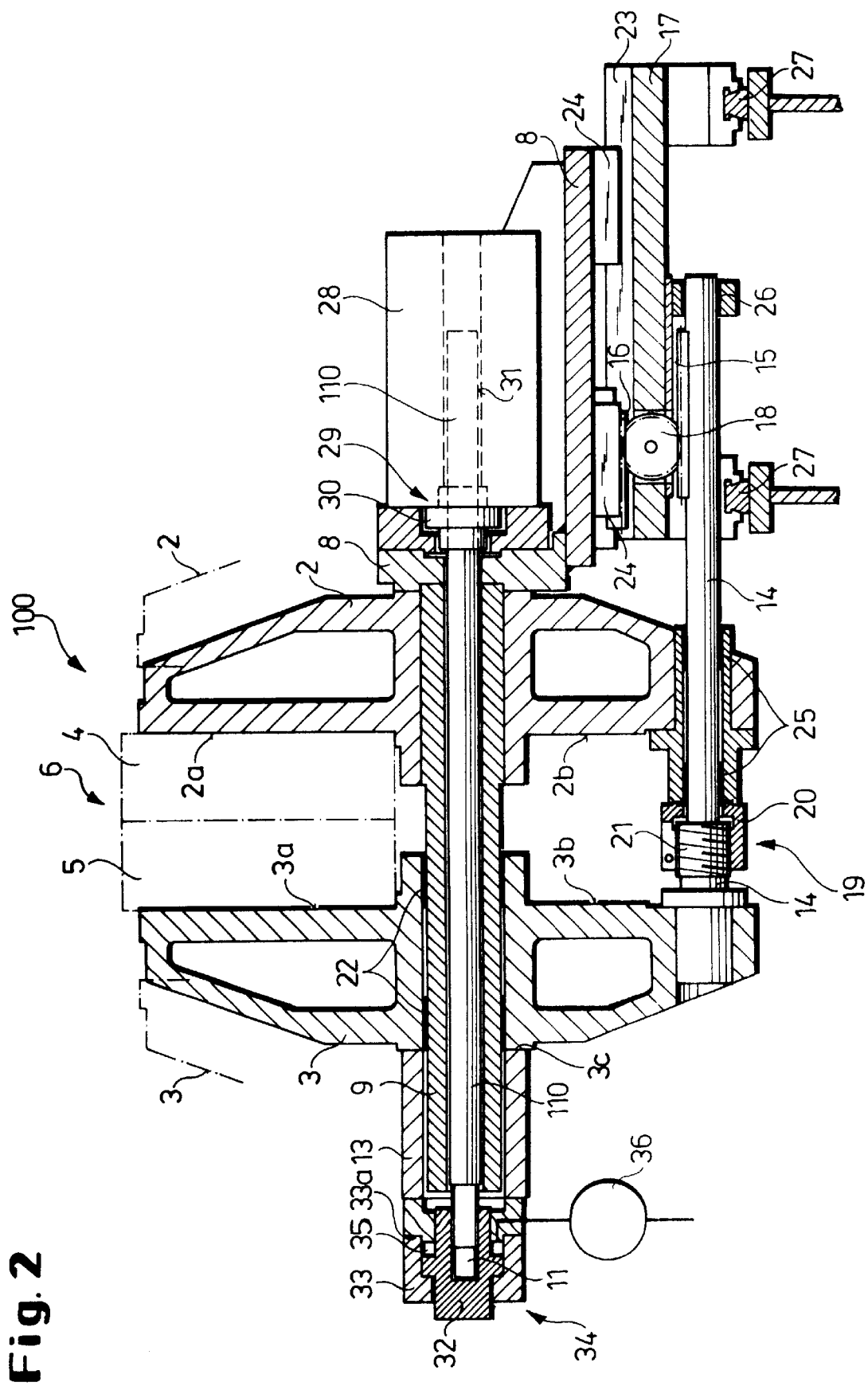
FIG. 2 is a view similar to FIG. 1 of a closing system in which the force generation utilizes a hollow shaft servodrive with a ball screw mechanism.

The closing apparatus of FIG. 2 differs from that of FIG. 1 both with respect to the construction and its manner of operation. The yoke arrangement, however, is the same as that of FIG. 1 and hence corresponding reference numerals are used for corresponding parts. Instead of a hydraulic or pneumatic closing cylinder, in this embodiment a fully electrical drive is used.

The hollow shaft servodrive 28, provides a ball-screw mechanism 29 of the type previously described and is flanged onto the closing slide 8. The rotatable nut 30 of the ball screw assembly 29 is designed to axially effect the traction rod or spindle 110 which is received in the guide beam 9. The spindle 110 may have a threaded end 31 driven by the nut 30 in its end received in the hollow shaft servodrive 28. The opposite end 11 of the rod is received in a block 32 which defines a fluid chamber 35 with a hydraulically pressurizable housing 33.

The hydraulic housing 33, the hydraulic chamber 35 and the block 32 which is shiftable with respect to the housing 33 forms an elastic element whose elasticity is provided by a gas-pressurized hydraulic accumulator 36 communicating with the chamber 35 and interposed between the traction rod 110 and the sleeve 13 bearing upon the boss 3c of the distal or remote yoke 3.

A further member 33a can close the compartment 35.

In this embodiment the electric motor hollow shaft servodriver 28 and the ball screw mechanism 29 moves the yoke 2 and 3 together during the mold closing operation so that the final closing position is urged and the closing force is applied. At least part of that closing force is applied through the hydraulic medium in chamber 38 by the member 32 which acts as a piston with a gas cushioning effect provided by the accumulator 36. The prestressed elastic element can also be a spring stack like the spring stack 37 to be described further in connection with FIGS. 3 and 4. The elastic element prevents overloading of the ball-screw mechanism. In an alternative operation, he electric motor drive can move the yokes 2 and 3 toward one another so that only a residual gap is provided between the mold parts, the closing force then being generated hydraulically by a hydraulic pressurization of the cylinder chamber 35.

Figure 3:
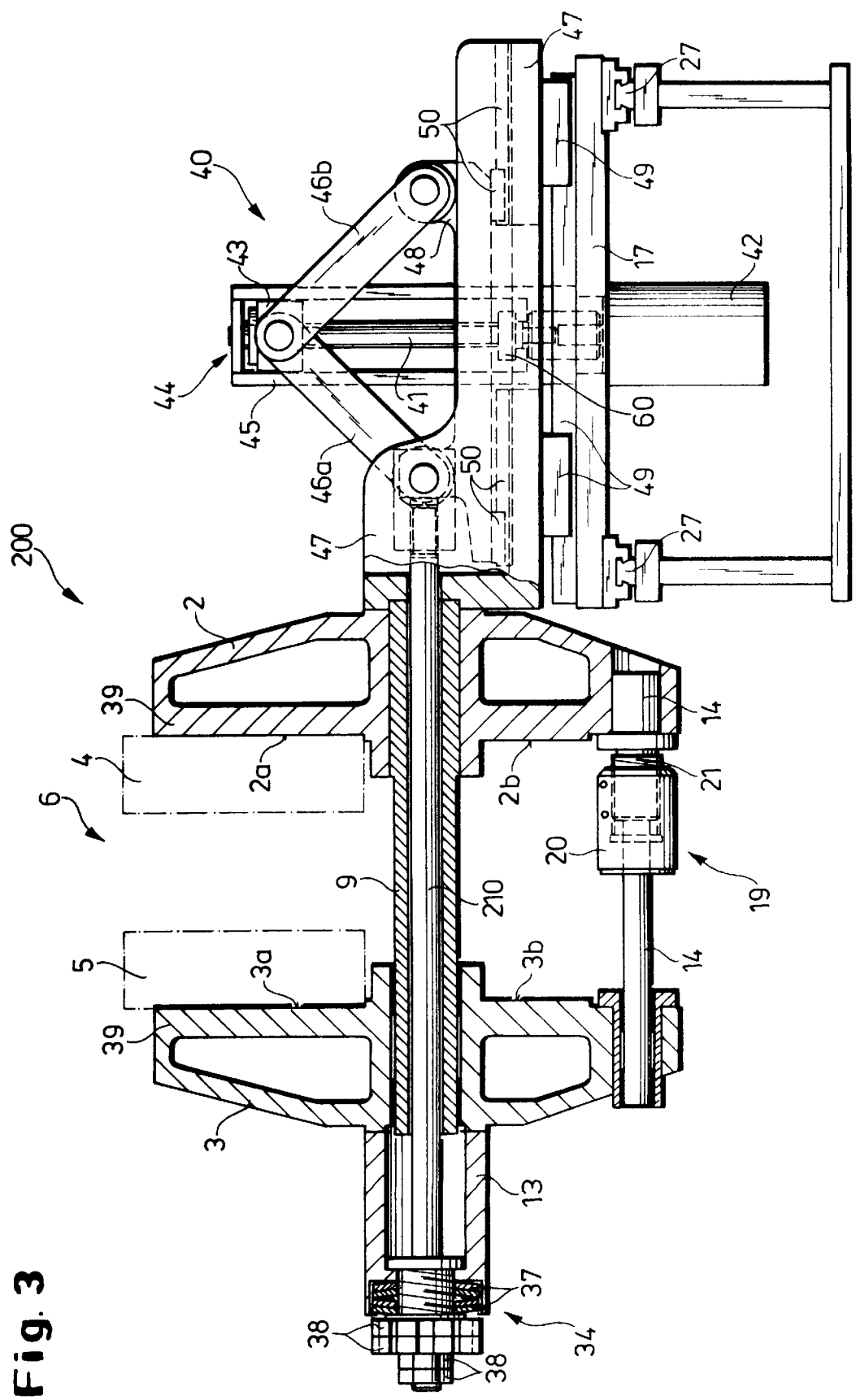
FIG. 3 is a partial side elevational view and partial section through another embodiment of a mold closer utilizing an electric servodrive but operating via a toggle-lever system showing the open position of the apparatus.
Figure 4:
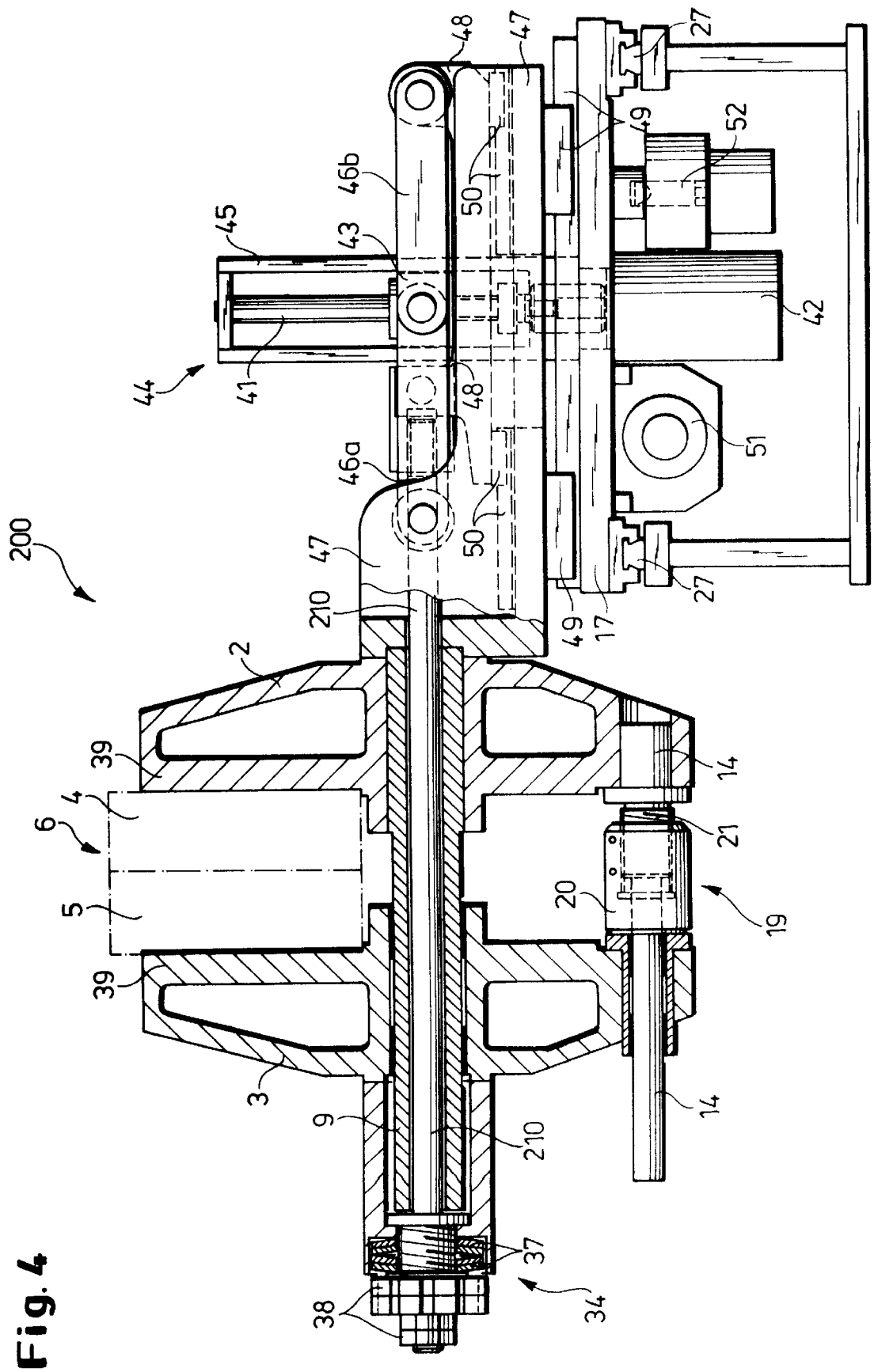
FIG. 4 is a similar view of the apparatus of FIG. 3 in the closed position for blow-molding an article in the mold.
Figure 5:
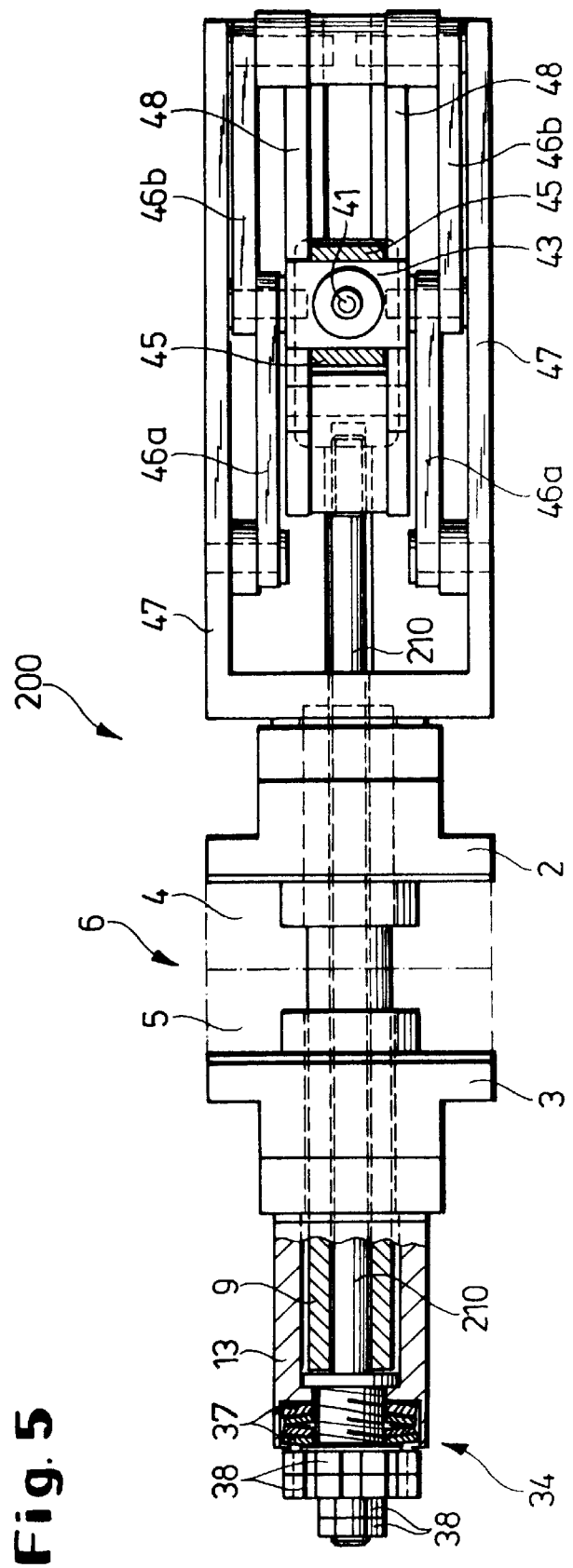
FIG. 5 is a top plan view of the apparatus of FIGS. 3 and 4 in the closed position of FIG. 4.

Another direct and symmetrical force-generating system has been shown in FIGS. 3–5 for the mold-closing mechanism 200. Here again similar functioning parts to those of the previous Figures have been given corresponding reference numerals.

While a separate synchronizing system is not required in the embodiment of FIGS. 3–5, I nevertheless prefer to couple the lower arms 2b and 3b of the yokes with an adjustable stop 19, the beam or bar of which has been shown at 14 and is anchored in one of the yokes.

In this embodiment, the traction rod 210 passing through the guide beam 9 engages at its distal end the spring stack 37 forming a resilient force-transmitting unit 34 which applies the force of the rod 210 to the distal yoke 3 symmetrically with the force applied by a toggle lever system 40 to the proximal yoke 2. The prestressing can be effected via the nuts 38 which can be used to increase or decrease the clamping effects on the Belleville washer spring stack 37. These nuts are threaded onto the rod 210. The pitch of the screw thread engaged by the nuts 38 can be the same as the pitch of the adjustable stop 19 so that the closing of the mold halves against one another can be stopped before the residual stroke is reached to achieve the fully-closed position.

For displacing the yokes 2 and 3 from the open position shown in FIG. 3 into the closed position shown in FIG. 4, the actuator or force generator is the toggle lever system 40 which comprises a spindle 41 forming part of a circulating ball-thread arrangement represented generally at 60 and driven by an electric motor servodrive 42. The spindle is rotated to displace a nut 43 from it supper position (FIG. 3) to its lower position (FIG. 4) in the supporting frame 45. At opposite sides of the nut 43, toggle levers 46a, 46b are pivotally connected (see FIG. 5). The spindle is journaled at 44 in the frame 45.

At their other ends the toggle levers 46a, 46b are pivotally connected to the proximal end of the rod 210 via a movable frame 48 (see the ends of the toggle levers 46b) while the ends of the toggle levers 46a are pivotally connected to a frame 47 movable with and bearing on the proximal yokes 2 and receiving the frame 48.

The frame 47 is guided on linear guides 49 on the transport carriage or plate 17 and guides 50 on the frame 47 serve to guide the frame 48 linearly in the opening and closing directions.

To urge the yokes 2, 3 toward on another, the spindle 41 is rotated to draw the nut 43 (FIG. 3) downwardly into the position shown in FIG. 4, whereupon the toggle levers 46a, 46b are stretched out and frames 47 and 48 are moved in opposite directions. Since the movements of the units 2 and 3 are synchronized, no other synchronizing means is required.

As soon as the adjustable stop 19 signals the end of the closing movement, the closing force, partly absorbed by the prestressed spring stack 37 is contributed to the molds in the mold closing position. The spring stack limits the development of the closing force. In FIG. 3 a locking mechanism 52 is shown which holds the mold in its closed position during shifting of the carriage 17 between the two working positions.

In all of the embodiments the forces applied to the two yokes are directly symmetrical from opposite sides and canting of the rear yoke 3 is excluded.

I claim:

1. A mold-closing apparatus comprising:

two linearly shiftable mutually juxtaposed yokes;

respective halves of a mold for shaping thermoplastic articles each mounted on one of said yokes; and a linear force generator acting directly on each of said yokes in line with a direction of shifting movement thereof for selectively drawing said yokes together and displacing said yokes apart to close and open said mold, said linear force generator comprising:

a guide beam traversing both of said yokes in said direction;

a slide movable in said direction and braced against one of said yokes and one end of said guide beam;

a traction rod extending through said guide beam and having a first end terminating at said slide and a second end remote from said slide; and an actuator on said slide acting in opposite directions directly against one of said yokes proximal to said slide and upon said first end of said traction rod, said second end of said traction rod acting directly upon said other of said yokes distal to said slide force-symmetrically with respect to force applied by said actuator to said one of said yokes, each of said yokes comprising an upper yoke arm receiving the respective mold half above said guide beam and a lower yoke arm extending oppositely of said upper yoke arm below said guide beam, said apparatus further comprising a further beam mounted at one side in one of said lower yoke arms and provided at an opposite side with a stop limiting displacement of said yokes toward one another.

2. The mold-closing apparatus defined in claim 1 wherein said further beam includes a synchronizing rod connecting said lower yoke arms.

3. The mold-closing apparatus defined in claim 2 wherein said actuator is a fluid-operated cylinder having a piston rod forming said traction rod.

4. The mold-closing apparatus defined in claim 2 wherein said actuator is a hollow-shaft servodrive having a ball screw cooperating with a spindle forming said traction rod, said traction rod having a nonrotating end acting upon said other of said yokes distal from said slide through a fluid-operated unit.

5. The mold-closing apparatus defined in claim 2 wherein said actuator comprises a toggle-lever assembly between said traction rod and said slide, and a ball screw drive connected to said toggle-lever assembly for actuating same.

6. The mold-closing apparatus defined in claim 5 wherein said assembly is mounted in a frame shiftable in said direction on said slider.

7. The mold-closing apparatus defined in claim 2 wherein said slider is mounted on a carriage shiftable perpendicular to said direction.

8. A mold-closing apparatus comprising:

two linearly shiftable mutually juxtaposed yokes;

respective halves of a mold for shaping thermoplastic articles each mounted on one of said yokes; and a linear force generator acting directly on each of said yokes in line with a direction of shifting movement thereof for selectively drawing said yokes together and displacing said yokes apart to close and open said mold, each of said yokes comprising an upwardly extending upper yoke arm receiving the respective mold half and a downwardly extending lower yoke arm opposite said upper yoke arm, said apparatus further comprising a beam mounted at one side in one of said lower yoke arms and provided at an opposite side with a stop limiting displacement of said yokes toward one another.

9. The mold-closing apparatus defined in claim 8 wherein said beam includes a synchronizing rod connecting said lower yoke arms.

10. The mold-closing apparatus defined in claim 1 wherein said force generator is a fluid-operated cylinder braced against one of said yokes and having a piston rod engaged with the other of said yokes.

11. A mold-closing apparatus comprising:

two linearly shiftable mutually juxtaposed yokes;

respective halves of a mold for shaping thermoplastic articles each mounted on one of said yokes; and a linear force generator acting directly on each of said yokes in line with a direction of shifting movement thereof for selectively drawing said yokes together and displacing said yokes apart to close and open said mold, said force generator is a hollow-shaft servodrive acting on one of said yokes and having a ball screw cooperating with a spindle forming a traction rod extending through said yokes, said traction rod having a nonrotating end acting upon the other of said yokes through a fluid-operated unit.

12. A mold-closing apparatus comprising:

two linearly shiftable mutually juxtaposed yokes;

respective halves of a mold for shaping thermoplastic articles each mounted on one of said yokes; and a linear force generator acting directly on each of said yokes in line with a direction of shifting movement thereof for selectively drawing said yokes together and displacing said yokes apart to close and open said mold, said force generator comprising a toggle-lever assembly connected between said yokes, and a ball screw drive connected to aid toggle-lever assembly for actuating same.

13. The mold-closing apparatus defined in claim 12 wherein said force generator and said yokes as mounted on a carriage shiftable perpendicular to said direction.

* * * * *